United States Patent [19]

Ueno

[11] 4,384,865
[45] May 24, 1983

[54] SPROCKET FOR A BICYCLE

[75] Inventor: Tadashi Ueno, Sakai, Japan

[73] Assignee: Shimano Industrial Company Limited, Osaka, Japan

[21] Appl. No.: 267,882

[22] Filed: May 28, 1981

Related U.S. Application Data

[63] Continuation of Ser. No. 54,910, Jul. 5, 1979, abandoned.

[30] Foreign Application Priority Data

Jul. 7, 1978 [JP] Japan ................................ 53-94131

[51] Int. Cl.³ ...................... F16H 55/06; F16H 55/12
[52] U.S. Cl. .................................. 474/160; 474/162; 74/448
[58] Field of Search ...................... 474/160, 162, 164; 74/446, 447, 448

[56] References Cited

U.S. PATENT DOCUMENTS

| | | | |
|---|---|---|---|
| 2,559,619 | 7/1951 | Henderson | 74/448 |
| 2,764,900 | 10/1956 | Warsmith | 474/162 |
| 3,439,551 | 4/1969 | Militana | 474/162 |
| 3,956,943 | 5/1976 | Yamasaki | 474/148 |
| 4,009,621 | 3/1977 | Segawa | 474/160 |
| 4,111,064 | 9/1978 | Purcell | 474/162 |
| 4,181,033 | 1/1980 | Nagano | 474/160 |
| 4,259,880 | 4/1981 | Ueno | 474/160 |

FOREIGN PATENT DOCUMENTS

| | | |
|---|---|---|
| 8851 | 3/1980 | European Pat. Off. . |
| 1029474 | 3/1953 | France . |
| 475021 | 11/1937 | United Kingdom . |
| 2005363 | 4/1979 | United Kingdom . |
| 2005778 | 4/1979 | United Kingdom . |
| 2005779 | 4/1979 | United Kingdom . |

Primary Examiner—Lawrence J. Staab
Attorney, Agent, or Firm—Stevens, Davis, Miller & Mosher

[57] ABSTRACT

A multi-stage sprocket for a bicycle is disclosed which omits at least one of several teeth provided at the outer periphery of the sprocket body. A toothed member having a number of teeth corresponding to the number of omitted teeth is formed of material superior to the material of the sprocket body in wear-resistance and is mounted to the tooth-omitted portion at the sprocket body.

12 Claims, 14 Drawing Figures

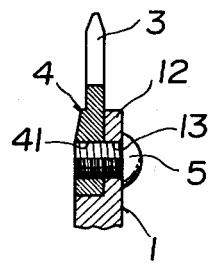
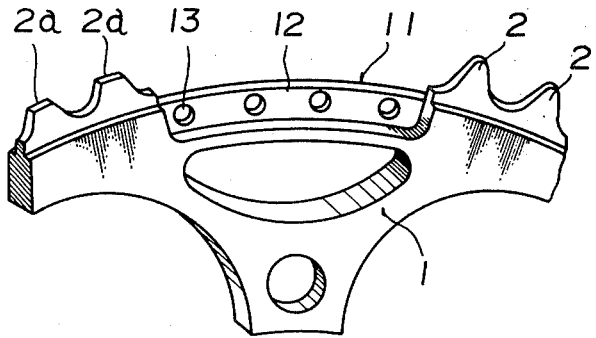
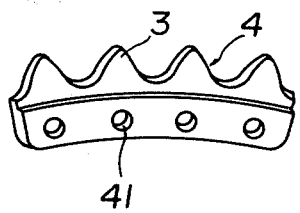
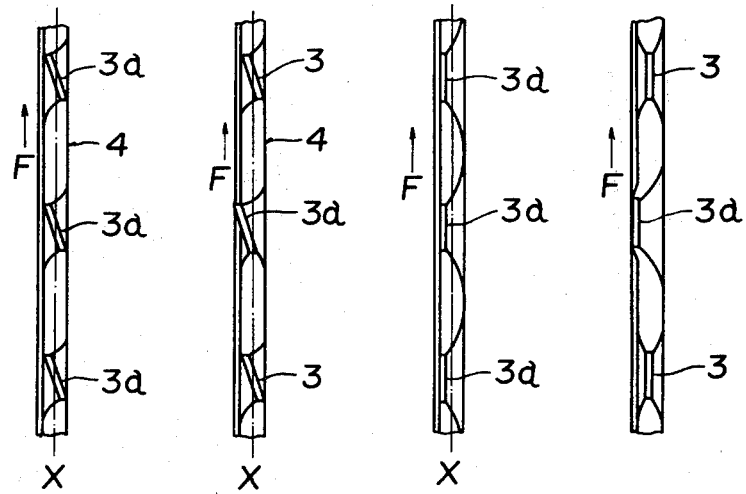

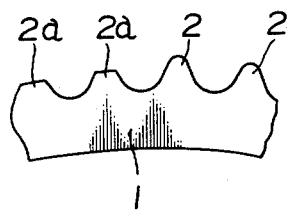
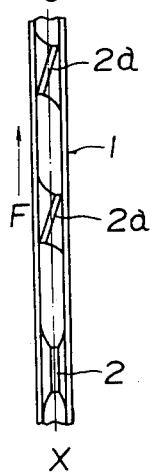
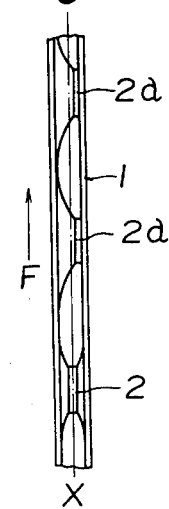
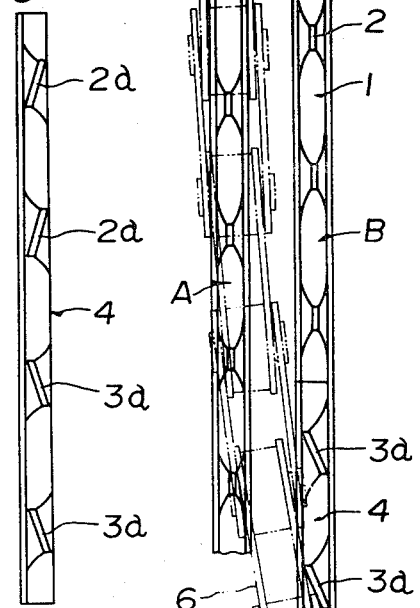
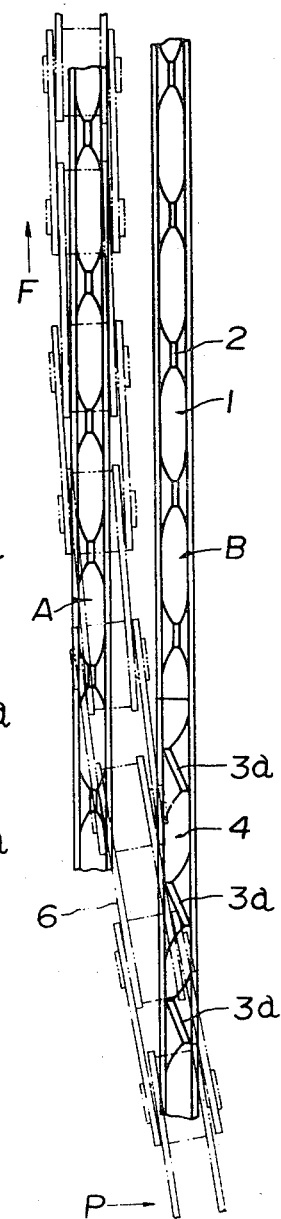

SPROCKET FOR A BICYCLE

This is a continuation of application Ser. No. 054,910, filed July 5, 1979, now abandoned.

BACKGROUND OF THE INVENTION

This invention relates to a sprocket for a bicycle, which is formed of material, such as an aluminum alloy, having little wear-resistance, and more particularly to a sprocket for a bicycle, which comprises a main body with a large number of teeth circumferentially provided at the outer periphery of the body and is used mainly as a crank means for the bicycle.

Generally, the multi-stage sprocket of two or more sprockets with a different number of teeth is mounted to a rear hub or crank means of the bicycle so that a driving chain, which is moved axially of the sprocket by means of a derailleur is switched to a desired sprocket for transmitting the driving force to a rear wheel in a given speed change ratio.

The sprocket, when used for a crank means, is larger in diameter and has 40 to 50 teeth and is formed of a lightweight material, such as an aluminum alloy, for reasons of light weight and economy. The light material has less wear-resistance, so that the multi-stage sprocket of light material wears out its teeth, especially those which initially catch the chain when changing speed wear out to a greater extent, whereby its durability becomes a problem. When the sprocket is formed of a wear-resistant material, such as iron, to improve durability, the weight increases and it becomes expensive to produce. As a result, a sprocket having the advantages of lightweight material and free from the above defects has not been available.

SUMMARY OF THE INVENTION

The present invention has been designed to overcome the problems resulting from a sprocket which is formed of material such as an aluminum alloy, of less wear-resistance and is light in weight and inexpensive to produce. A main object of the invention is to provide a sprocket having less tooth wear and excellent durability while employing wear-resistant material.

Another object is to provide a sprocket having an improved speed change efficiency when used for a multi-stage sprocket in combination with a plurality of sprockets having a different number of teeth.

The inventor has observed that when the sprocket is made from a material having low wear-resistance and used for the multi-stage sprocket, tooth wear mostly occurs at teeth which are the first to catch the chain when changing the speed. Accordingly, he has provided for separately forming the teeth likely to catch the chain of wear-resistant material.

The aforesaid teeth likely to catch the chain, are the teeth at the position coincident with the engaging point of the chain where the chain is about to engage with the teeth of the larger diameter sprocket when switched from the smaller diameter sprocket of the multi-speed sprocket. The engaging point is located at a length coincident with an integer multiple of the chain pitch from the point where the chain begins to disengage from the smaller diameter sprocket. In this instance, the positional relationship between teeth of both the sprockets is changed due to the different number of teeth thereof, whereby the point which engages with the larger diameter sprocket when the chain is moved thereto may or may not engage the tips of teeth of the larger diameter sprocket.

The sprocket of the invention omits at least one tooth at the outer periphery of the sprocket body and a toothed member which is formed of a superior wear-resistant material and has at least one tooth for each omitted tooth is provided being mounted to the tooth-omitted portion at the sprocket body.

When a plurality of sprockets are combined to form the multi-stage sprocket, the teeth will have more opportunities to catch the chain and the use of the combination of a plurality of the aforesaid sprockets can improve the durability of the teeth.

In addition, the teeth at the toothed member may be formed similar to those at the sprocket body. However, the teeth at the toothed member, when formed as an easy engagement type as hereinafter described in an embodiment, are capable of positively catching the chain, thereby further improving the durability of the teeth.

These and other objects and novel features of the invention will be more apparent from the following description of several embodiments in accordance with the accompanying drawings, in which:

DESCRIPTION OF THE DRAWINGS

FIG. 3 is an enlarged sectional view taken on line III—III in FIG. 1,

FIG. 4 is a partially enlarged perspective view of the sprocket body,

FIG. 5 is a perspective view of a toothed member,

FIGS. 6 through 9 are views explanatory of modified embodiments of teeth for easy engagement, FIGS. 10 through 12 are views explanatory of embodiments of teeth for easy disengagement, FIG. 13 is a view explanatory of a modified embodiment of teeth, and FIG. 14 is a view explanatory of the chain in engagement with the sprockets.

DESCRIPTION OF THE PREFERRED EMBODIMENTS

Figure 1:
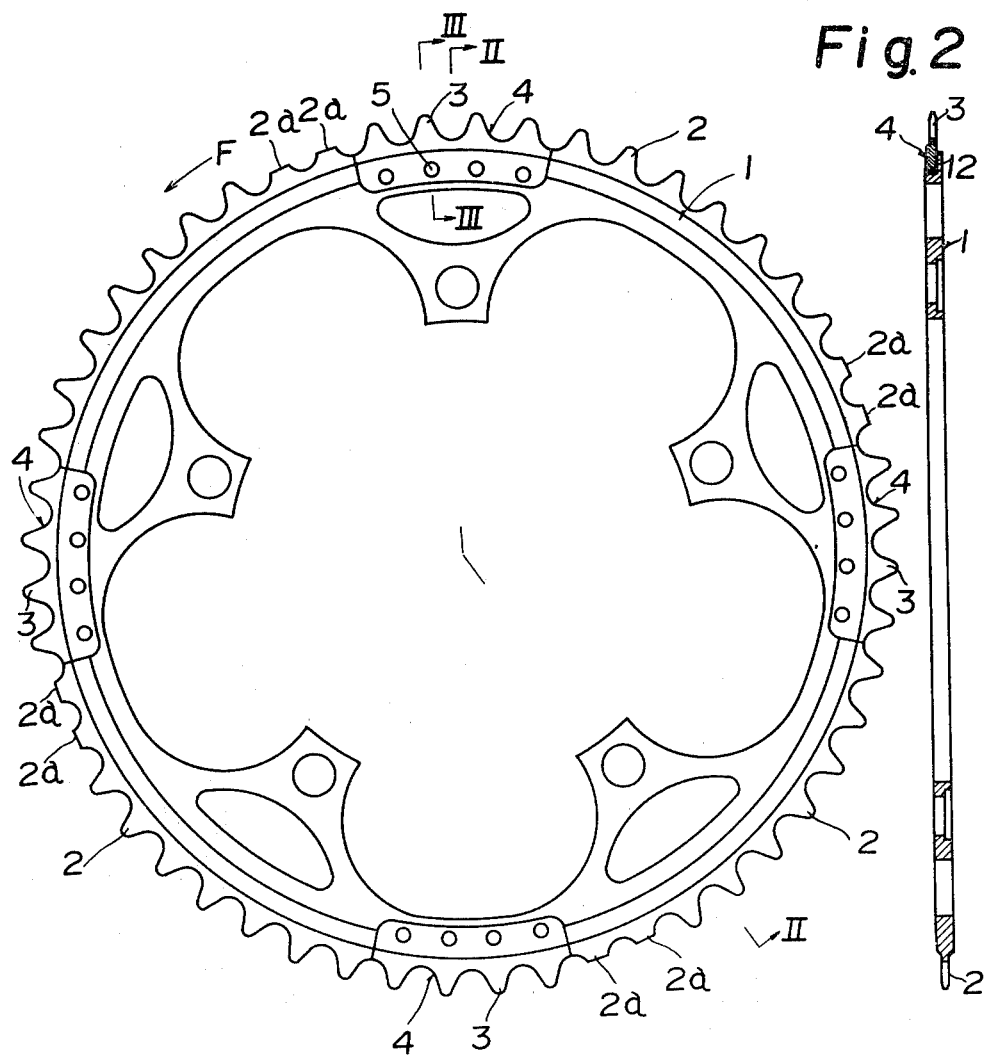
FIG. 1 is a front view of a sprocket of the invention.
Figure 2:
FIG. 2 is a sectional view taken on line II—II in FIG. 1.

Referring to the drawings, reference numeral 1 designates an annular sprocket body. The body 1 has a central bore and at the outer periphery a number of teeth 2 circumferentially provided and spaced at regular intervals. The body 1 also is formed of lightweight material, such as an aluminum alloy, and molded integrally with the teeth 2 by die casting. One or more adjacent teeth (4 teeth are shown) are omitted radially inwardly of the sprocket 1 to form a tooth-omitted portion 11 as shown in FIG. 4. The tooth-omitted portion 11 has a small thickness radially inwardly of the body 1 and forms a toothed member mounting portion 12. To the mounting portion 12 is mounted a toothed member 4 having teeth 3 as many in number as there are omitted teeth, the teeth 3 offsetting the omitted teeth.

The toothed member 4 is formed of wear-resistant material and its body is made smaller in thickness than the teeth carrying portion of body 1. Pairs of a threaded bore 41 and through bore 13 are provided at the toothed member 4 and the toothed member mounting portion 12, respectively, and screws 5 are inserted into the bores 13 and screwed with the bores 41, thereby detachably mounting the toothed member 4 to the body 1.

The toothed member 4 is preferably detachably mounted as aforementioned, but may be fixed to the body 1 by welding or through connecting pins. The toothed member mounting portion 12 at the sprocket 1 need not be made smaller in thickness for mounting the toothed member 4.

It is preferable that the teeth 3 at toothed member 4 are formed for an easy engagement type of operation so that the chain is switched readily from the smaller diameter sprocket to the larger diameter one, thereby improving the speed change efficiency.

Referring to FIGS. 6 through 9, various kinds of easy engagement type sprockets are shown. A first type shown in FIG. 6 has at least one tooth 3a among the teeth 3 at toothed member 4 slanted at the tip with respect to the center line X of thickness of teeth in the full range of thickness thereof so that the front end in the driving rotation direction F of the sprocket body 1 is slanted leftward looking from the rear in the same direction.

The reason for this construction is that when the chain is switched, especially from the smaller diameter sprocket to the larger diameter one, the speed change efficiency and wear of teeth become a problem, whereby the tip of each tooth 3a is slanted toward the smaller diameter sprocket (leftward in FIG. 6) as aforegoing.

A second type sprocket is so constructed that at least one tooth 3a at the toothed member 4 is, as shown in FIG. 7, slanted in a range of thickness of teeth with respect to the center line X in the same manner as the first type. Furthermore, the front end of tip in the rotation direction F is projected outwardly, thicknesswise, of the teeth to an extent that the chain, when switched, is readily caught by the projected tip.

A third type of sprocket is such that at least one tooth 3a at the toothed member 4 is, as shown in FIG. 8, chamfered at the outside with respect to the smaller diameter sprocket so that the tip of tooth 3a is shifted toward the smaller diameter sprocket (leftward in FIG. 8) with respect to the center line X of thickness of the teeth.

A fourth type, is so constructed that at least one tooth 3a at the toothed member 4 is, as shown in FIG. 9, chamfered at the outside with respect to the smaller diameter sprocket and the tip of tooth 3a is projected axially outward more than the thickness thereof toward the smaller diameter sprocket (leftward in FIG. 9).

On the other hand, it is preferable that one or some adjacent teeth 2 (two are shown) at the body 1 carrying the toothed member 4 are formed in easy disengagement types for facilitating disengagement of the chain from the teeth when changing the speed, thereby improving the speed change efficiency for changing the speed from the larger diameter sprocket to the smaller one.

The above easy disengagement type of sprockets are formed as shown in FIGS. 10 through 12. A first disengagement type of sprocket requires tips of the teeth 2 at the sprocket body 1 to be cut away and lowered as shown in FIGS. 1 and 10, thereby forming teeth 2a of an easy disengagement type of sprocket.

A second disengagement type of sprocket is shown in FIG. 11, in which the teeth 2 are slanted at tips thereof in a range of tooth thickness so that the front end of the tip in the driving rotation direction F of the sprocket body 1 is slanted rightward looking from the rear in the same direction with respect to the center line X of thickness of teeth. In brief, the rear end of the tip of each tooth 2a in the rotation direction F is slanted toward the smaller diameter sprocket (leftward in FIG. 11).

A third disengagement type of sprocket is shown in FIG. 12, in which the teeth 2 are chamfered at the sides facing the smaller diameter sprocket so that the tips of the teeth may be shifted apart from the smaller diameter sprocket, thereby forming the teeth 2a of an easy disengagement type sprocket.

The position of the aforesaid teeth 2a are not specified. It is preferable that one or some teeth behind the teeth 2a in the chain travelling direction (in the arrow F direction in FIG. 1), are formed of the toothed member 4 from wear-resistant material and mounted to the sprocket body 1 as shown in FIG. 1. The reason for this is that when switching the chain from the larger diameter sprocket to the smaller diameter one the chain contacts with the teeth behind the chain disengaging teeth in the chain travelling direction to cause frequent wearing of the teeth. The teeth behind the disengaging teeth are formed of material having greater wear-resistance to thereby reduce the occurrence of tooth wear. In this instance, the teeth at the toothed member need not be formed similar to the aforesaid easy engagement type sprocket teeth.

In addition, the number of teeth of toothed member 4 of the easy engagement type teeth and the teeth 2a of easy disengagement type depends upon size of the sprocket body 1, one tooth being sufficient.

Two or more sprockets constituted as aforegoing and having a different number of teeth are combined and mounted mainly to crank means (or the rear hub) to be used as the front chain gear. The chain is shifted by the derailleur for switching to a desired sprocket so that the driving force from pedalling is transmitted to the rear wheel at a given speed change ratio.

The speed change efficiency becomes a problem in that the chain, when shifted from a smaller diameter sprocket to a larger diameter one, is caught by teeth thereof and that the chain, when shifted to the smaller diameter sprocket from the larger one, disengages from the teeth thereof. Hence, the front chain gear comprised mainly of two sprockets having a different number of teeth may employ the sprocket of the invention as the high speed larger diameter sprocket and the usual teeth arranged in alignment on the center line X as the low speed smaller diameter sprocket.

The rear gear of 3 to 5 sprockets having a different number of teeth may use the usual sprocket as the smallest diameter high speed sprocket and the sprockets of the invention are used as other sprockets.

Next, the engagement of chain with the sprocket when the chain is switched by the derailleur, will be described.

Referring to FIG. 14, the movable member at the derailleur moves the chain 6 in the direction P from the smaller diameter sprocket A to the larger diameter one B, so that the chain 6 remains in part at the front side of sprocket A in the direction of rotation thereof and is overshifted in part at the derailleur side to reach the lateral side of the sprocket B, thus being oblique as shown.

At this time, where the toothed member 4 is disposed at the portion of sprocket B where the chain is about to engage therewith, the wear-resistant teeth of toothed member 4 are able to catch the chain, thereby considerably reducing wear of teeth. Furthermore, the teeth of easy engagement type at the toothed member 4 can immediately catch the chain without any interference, resulting in an improved speed change efficiency and the wear of teeth caused by interference of the chain with the larger diameter sprocket is prevented. Furthermore, the teeth 3a made of wear-resistant material are particularly effective to reduce the wear of teeth for catching the chain.

On the other hand, when the chain 6 is switched from the larger diameter sprocket B to the smaller diameter sprocket A, the teeth 2a of the easy disengagement type at the sprocket B enable the chain 6 to be disengaged quickly from the sprocket B, resulting in a quick switching of the chain and an improved speed change efficiency.

In addition, the aforesaid teeth 2a of the easy disengagement type may, alternatively, be formed in a separate toothed member of wear-resistant material and attached to the sprocket body 1.

Also, the teeth 3a of easy engagement type and those 2a of disengagement type, are formed in a separate toothed member 4 made of wear-resistant material as shown in FIG. 13, so that at least one toothed member may be mounted to the sprocket body 1.

As clearly understood from the aforesaid description, a predetermined number of teeth among a large number of teeth at the outer periphery of the sprocket body are formed in a toothed member of wear-resistant material. The teeth at the toothed member are disposed at the position of the sprocket body coincident with the point of the chain where the chain is about to engage with the teeth of the larger diameter sprocket, the chain's engagement point being located at a length coincident with an integer multiple of the chain pitch from the point where the chain disengages from the smaller diameter sprocket. In other words, the toothed member is located at the position where the teeth are likely to catch the chain. Hence, tooth wear is considerably reduced. As a result, the sprocket body may be formed of a lightweight material, such as an aluminum alloy, so that the sprocket is light in weight and inexpensive to produce while the durability thereof is obtained as a whole. When the teeth at a toothed member wear after long use, the toothed member need only be changed, thereby providing an economical construction.

As many apparently widely different embodiments of this invention may be made without departing from the spirit and scope thereof, it is to be understood that the invention is not limited to the specific embodiments thereof except as defined in the appended claims.

What is claimed is:

1. A multi-stage sprocket assembly for a bicycle comprising first and second sprockets of different diameters for receiving a chain shifted among said sprockets to change the speed of said bicycle, a larger diameter sprocket comprising a predetermined number of spaced teeth located on and being integral with a portion of a circumferential periphery of a sprocket body, the remaining portion of said circumferential periphery being devoid of said predetermined number of spaced teeth, said sprocket body and predetermined number of spaced teeth being made of a material having a predetermined wear resistance, said portion devoid of said predetermined number of spaced teeth having connected thereto at least one toothed member which is separate from said sprocket body and made from a different material having a greater wear resistance than the material of said sprocket body and predetermined number of spaced teeth, each said tooth member having teeth with a greater wear resistance than that of said predetermined number of teeth, the spacing of the teeth of each said toothed member being the same as that of said predetermined number of teeth of said sprocket body, said tooth member including at least one tooth having a construction permitting easy engagement of a driving chain, the teeth of said toothed member being coincident with the point of engagement of said chain, said engagement point being located at a distance from the point where the chain disengages from a smaller diameter sprocket equal to an integer multiple of the chain pitch whereby the greater wear resistance teeth of said toothed member catch said chain.

2. A multi-stage sprocket assembly for a bicycle according to claim 1, wherein at least one of said teeth of said toothed member is slanted at its tip with respect to the center line of thickness of said toothed member in such a manner that the front side of said tip in the direction of the driving rotation of said sprocket body is slanted leftward looking from the rear in said direction, whereby a tooth is formed for easily engaging a chain.

3. A multi-stage sprocket assembly for a bicycle according to claim 1, wherein at least one of said teeth of said toothed member is shifted leftward looking from the rear in the driving rotation direction of said sprocket body with respect to the center line of thickness of said toothed member, said at least one tooth being formed for easily engaging a chain.

4. A multi-stage sprocket assembly for a bicycle according to claim 1, wherein at least one of said teeth among the predetermined number of teeth provided circumferentially at the outer periphery of said sprocket body is formed for easy disengagement whereby the chain in engagement with said at least one tooth is easily disengageable therefrom.

5. A multi stage sprocket assembly for a bicycle according to claim 4, wherein said at least one of said teeth among the predetermined number of teeth provided circumferentially at the outer periphery of said sprocket body is cut out at the tip to reduce the height of the tooth.

6. A multi-stage sprocket assembly for a bicycle according to claim 4, wherein said at least one of said teeth among the predetermined number of teeth provided circumferentially at the outer periphery of said sprocket body is slanted at the tip with respect to the center line of axial thickness of said sprocket body in such a manner that the front side in the driving rotation direction of said sprocket body is slanted rightward looking from the rear in the same direction.

7. A multi-stage sprocket assembly for a bicycle according to claim 4, wherein said at least one of said teeth among the predetermined number of teeth provided circumferentially at the outer periphery of said sprocket body is shifted rightward looking from the rear in the driving rotation direction of said sprocket body.

8. A multi-stage sprocket assembly for a bicycle according to claim 1, wherein said toothed member is detachable from said sprocket body.

9. A multi-stage sprocket assembly for a bicycle according to claim 1, wherein the number of teeth omitted from said portion of said sprocket body devoid of said predetermined number of teeth is equal to the number of teeth provided on said toothed member, at least one of said teeth of said toothed member being formed for easy engagement with a chain, and at least one of said teeth at said toothed member being formed for easy disengagement with a chain.

10. A multi-stage sprocket assembly for a bicycle according to claim 1 wherein said predetermined number of spaced teeth are divided into a plurality of groups of teeth which are separated by a plurality of portions on the circumferential periphery of said sprocket body devoid of said predetermined number of teeth, each said portion devoid of said predetermined number of teeth containing a said toothed member.

11. A multi-stage sprocket assembly for a bicycle according to claim 1, wherein at least one of said teeth of said toothed member is formed for easy disengagement whereby the chain in engagement with said one tooth is easily disengageable therefrom.

12. A multi-stage sprocket assembly for a bicycle comprising first and second sprockets of different diameters for receiving a chain shifted among said sprockets to change the speed of said bicycle, a larger diameter sprocket comprising a predetermined number of spaced teeth located on and being integral with a portion of a circumferential periphery of a sprocket body, the remaining portion of said circumferential periphery being devoid of said predetermined number of spaced teeth, said sprocket body and predetermined number of spaced teeth being made of a material having a predetermined wear resistance, said portion devoid of said predetermined number of spaced teeth having connected thereto at least one toothed member which is separate from said sprocket body and made from a different material having a greater wear resistance than the material of said sprocket body and predetermined number of spaced teeth, each said tooth member having teeth with a greater wear resistance than that of said predetermined number of teeth, the spacing of the teeth of each said toothed member being the same as that of said predetermined number of teeth of said sprocket body.

* * * * *